US00RE38480E

(19) United States
(12) Reissued Patent
Catoen et al.

(10) Patent Number: US RE38,480 E
(45) Date of Reissued Patent: Mar. 30, 2004

(54) INJECTION NOZZLE AND METHOD FOR INJECTION MOLDING

(75) Inventors: Bruce Catoen, Georgetown (CA); Rajan Puri, Mississauga (CA)

(73) Assignee: Husky Injection Molding Systems Ltd., Bolton (CA)

(21) Appl. No.: 10/024,714

(22) Filed: Dec. 21, 2001

Related U.S. Patent Documents

Reissue of:
(64) Patent No.: 6,214,275
Issued: Apr. 10, 2001
Appl. No.: 09/325,895
Filed: Jun. 4, 1999

(51) Int. Cl.[7] ..... B29C 45/23
(52) U.S. Cl. ..... 264/328.9; 264/334; 425/556; 425/564; 425/566
(58) Field of Search ..... 264/328.9, 334; 425/556, 564, 566, 563, 565

(56) References Cited

U.S. PATENT DOCUMENTS 2,828,507 A * 4/1958 Strauss
3,671,159 A * 6/1972 Greenberg et al.
4,416,608 A * 11/1983 Deardurff
4,588,370 A * 5/1986 Ichizawa et al.
4,820,467 A * 4/1989 Ehrler et al.
5,346,659 A * 9/1994 Buhler et al.
5,423,672 A * 6/1995 Gordon
6,074,191 A * 6/2000 Gellert et al. ..... 425/564

FOREIGN PATENT DOCUMENTS

EP 0 825 007 A1 2/1998
JP 52-151358 * 12/1977
WO WO 94/14591 * 7/1994
WO WO 99/22926 * 5/1999

OTHER PUBLICATIONS

Patent Abstracts of Japan, vol. 16, No. 464 (M–1316), Sep. 28, 1992 & JP 04 164618 (Mitsubishi Material Corp), Jun. 10, 1992.*

* cited by examiner

*Primary Examiner*—Tim Heitbrink
(74) *Attorney, Agent, or Firm*—Katten Muchin Zavis Rosenman

(57) ABSTRACT

A valve stem is mounted in a nozzle body, with the valve stem moving from an open position retracted from the injection orifice permitting the flow of resin to the mold cavity, to a closed position blocking the injection orifice and preventing the flow of resin to the mold cavity, and to an advanced position within the gate nub area to assist in the ejection of a molded part and clear the gate nub area.

76 Claims, 3 Drawing Sheets

INJECTION NOZZLE AND METHOD FOR INJECTION MOLDING

Matter enclosed in heavy brackets [ ] appears in the original patent but forms no part of this reissue specification; matter printed in italics indicates the additions made by reissue.

BACKGROUND OF THE INVENTION

When injection molding plastic preforms, as for example preforms of polyethylene terephthalate (PET), some systems form a gate nub or projection area from the molded part that is allowed to solidify on the molded part and is later removed from the molded part in a subsequent operation. This gate nub or projection is a depository for undesirable resin crystallinity that typically forms in the mold gate area. If the nub is subsequently cut off one has a molded preform which is free of gate crystallinity. Such a system is shown in U.S. Pat. No. 4,588,370 to Ichizawa et al., patented May 13, 1986.

A second approach is to cause the gate nub to break off the molded part during mold opening and then eject the removed nub from the gate area when the mold is open. This is shown in Japanese Patent Application No. 52-151358, published Dec. 15, 1977. In this procedure the valve stem of a hot runner has a "gate puller" undercut machined into its end so that the gate nub solidifies and forms around the gate puller when the valve stem is in the gate closed position. Then as the mold opens the valve stem is retracted to break off the nub which then appears to fall free of the mold when the mold cavity is moved away from the hot runner system. This considerably complicates mold construction and does not appear to provide a foolproof nub removal and ejection system.

The automatic degating of a sprue is known in other molding applications. U.S. Pat. No. 4,820,467 to Ehrler et al., patented Apr. 11, 1989, shows a system in which a hot runner molds a cold sprue gated disc. After solidification of the sprue a sleeve surrounding the nozzle tip advances to eject the sprue and degate it from the molded part and simultaneously form a hole therein. The cold, degated sprue is then automatically conveyed away from the gate area down a chute in the mold.

U.S. Pat. No. 5,346,659 to Buhler et al., patented Sep. 13, 1994, shows another cold sprue gating and ejection system similar to the '467 patent in which the ejection means is built into the top of the mold core.

U.S. Pat. No. 5,423,672 to Gordon, patented Jun. 13, 1995, shows a molding device for forming a disc with a hole therein. This patent shows a valve gated hot runner in which the valve stem is moved to an intermediate position by means of a dual piston combination. In the disc molding operation the valve stem is first moved forward to open the valve gate and allow resin to fill the mold cavity. Next the valve stem is partially retracted to block the melt flow and allow a lower part of the valve stem to form the hole in the disc. Finally, the valve stem is fully retracted to pull its hole forming section out of the molded part and to allow the molded part to be ejected conventionally from the core side of the mold.

U.S. Pat. No. 3,671,159 to Greenberg et al., patented Mar. 6, 1970, shows a valve gating system in which the valve stem is hollow and conveys compressed air to assist in ejecting the part as the mold is opened. The valve stem is advanced into the mold cavity to expose the air channel orifice in the valve stem and to allow it to assist in the mold opening and part ejection. A system such as this, however, risks blocking the air passages during injection of the melt while the mold cavity is being filled.

It is a principal object of the present invention to provide an improved injection nozzle system and method for injection molding which includes a movable valve stem and a valve gate nub area.

It is a further object of the present invention to provide a device and method as aforesaid in which the valve stem is conveniently and expeditiously used to advance into the mold cavity-valve gate nub area in order to aid in ejection of the molded part and to clear debris from the valve gate area.

Further objects and advantages of the present invention will appear hereinbelow.

SUMMARY OF THE INVENTION

In accordance with the present invention the foregoing objects and advantages are readily obtained.

The present invention provides an injection nozzle for injection molding plastic resin from a source of molten resin to a mold cavity, which comprises: a mold cavity; an injection nozzle with a nozzle body and a nozzle tip and having an internal flow channel therein communicating with an injection orifice which in turn communicates with said mold cavity for transportation of molten resin to the mold cavity; a valve gate nub area between the mold cavity and injection orifice; a valve stem mounted in the injection nozzle; and means to move the valve stem between an open position retracted from the injection orifice permitting the flow of resin to the mold cavity, a closed position blocking the injection orifice and preventing flow of resin to the mold cavity, and an advanced position within the valve gate nub area to assist in ejection of a molded part and to clear the valve gate nub area. In the preferred embodiment the valve gate nub area includes a passageway between the mold cavity and injection orifice with an annular wall, wherein in the advanced position the valve stem is moved adjacent said annular wall to substantially fill the passageway.

The present invention also provides a method for injection molding resin from a source of molten resin to a mold cavity which comprises: providing an injection nozzle with a nozzle body and a nozzle tip and having an internal flow channel therein communicating with an injection orifice which in turn communicates with a mold cavity; transporting molten resin from said internal flow channel to said mold cavity; positioning a valve gate nub area between the mold cavity and injection orifice; mounting a valve stem in the injection nozzle; and moving the valve stem between an open position retracted from the injection orifice permitting flow of resin to the mold cavity, a closed position blocking the injection orifice and preventing flow of resin to the mold cavity, and an advanced position within the valve gate nub area to assist in ejection of a molded part and to clear the valve gate nub area.

Further features of the present invention will appear hereinbelow.

BRIEF DESCRIPTION OF THE DRAWINGS

The present invention will be more readily understandable from a consideration of the accompanying illustrative drawings showing a preferred embodiment, wherein.

DETAILED DESCRIPTION OF PREFERRED EMBODIMENT(S)

Figure 1:
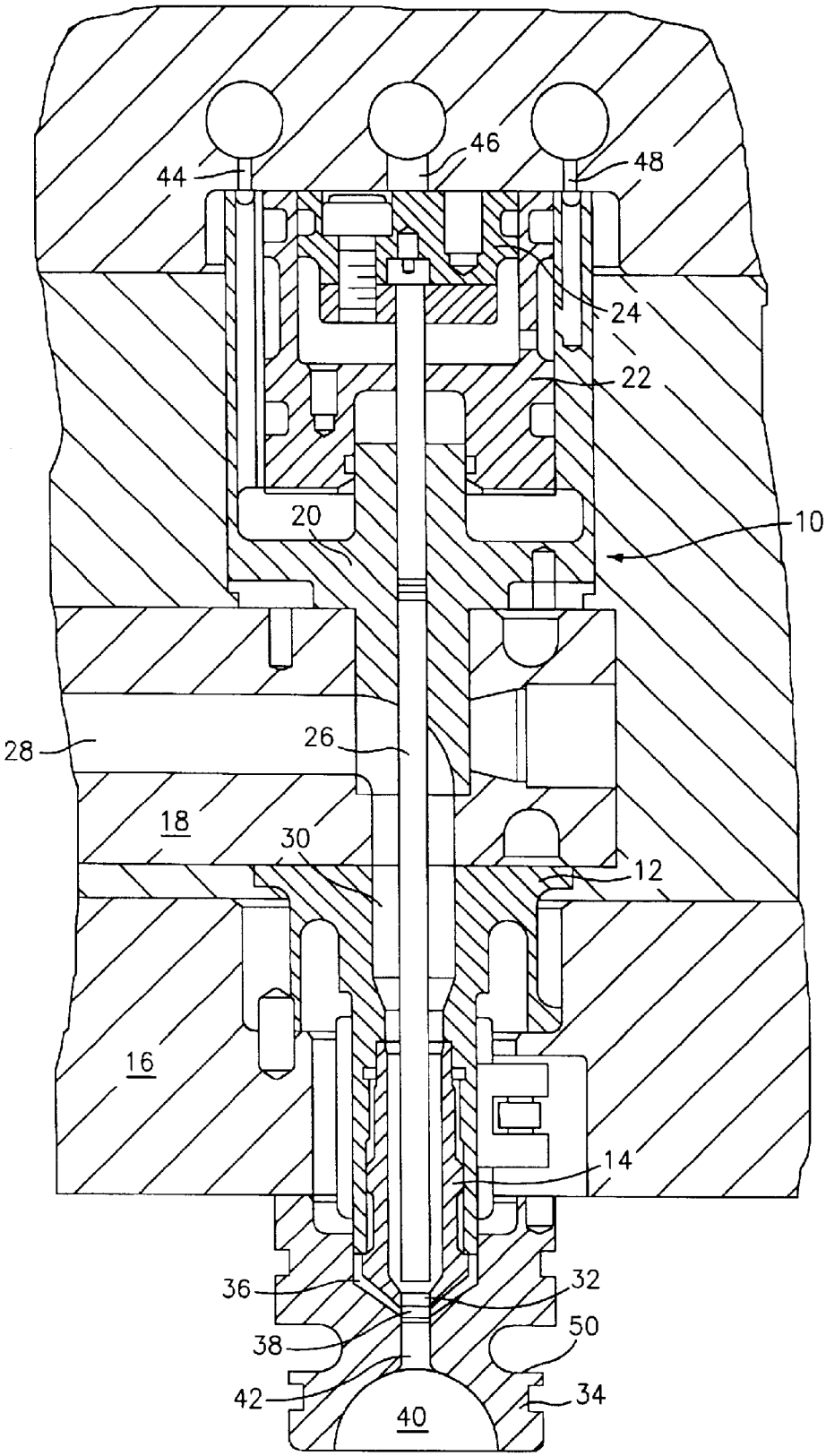
FIG. 1 is a sectional view through a nozzle assembly of the present invention with the valve gate open and the valve stem retracted.
Figure 2:
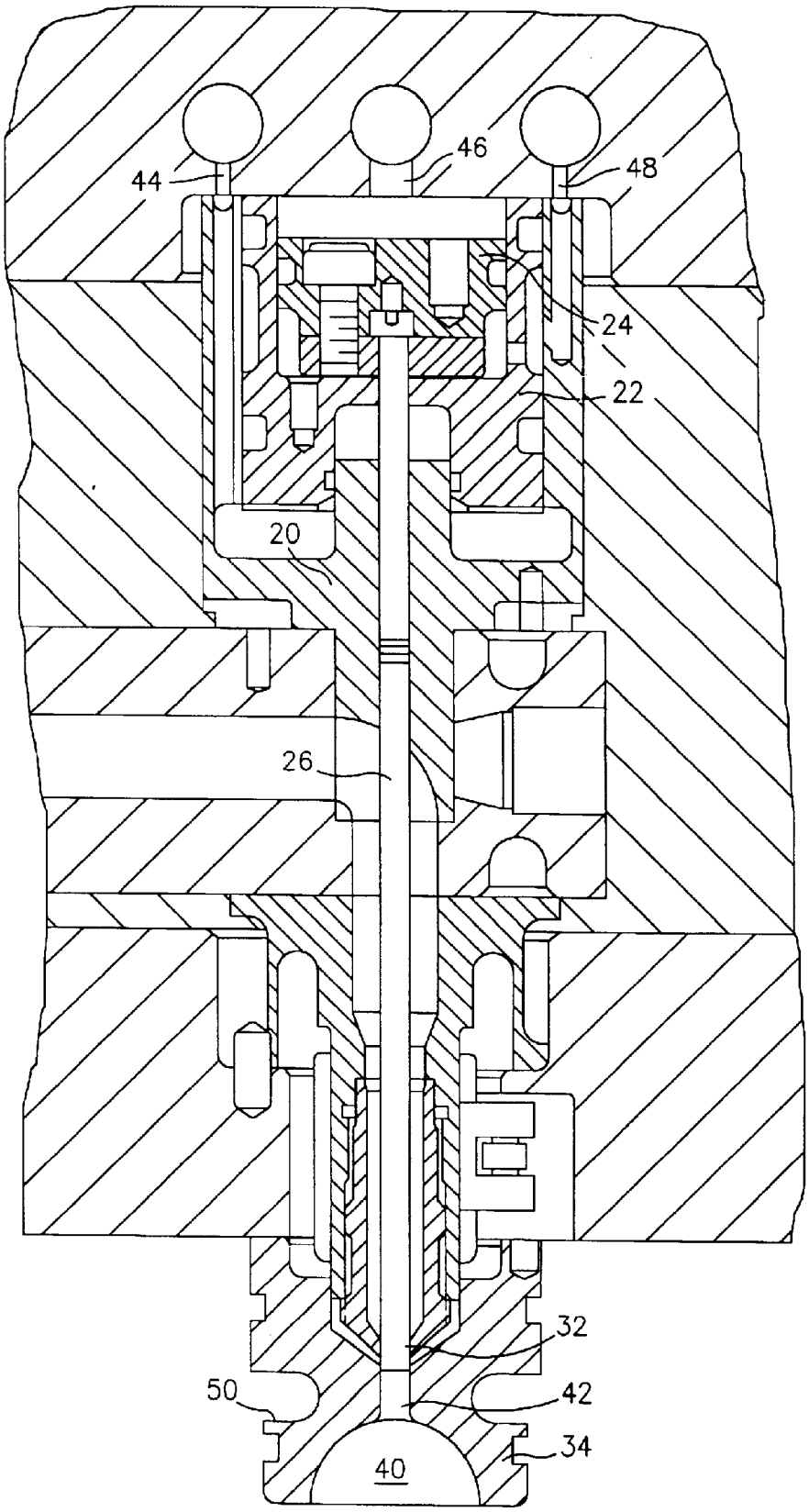
FIG. 2 is a sectional view similar to FIG. 1 with the valve gate closed and the valve stem in the closed position.
Figure 3:
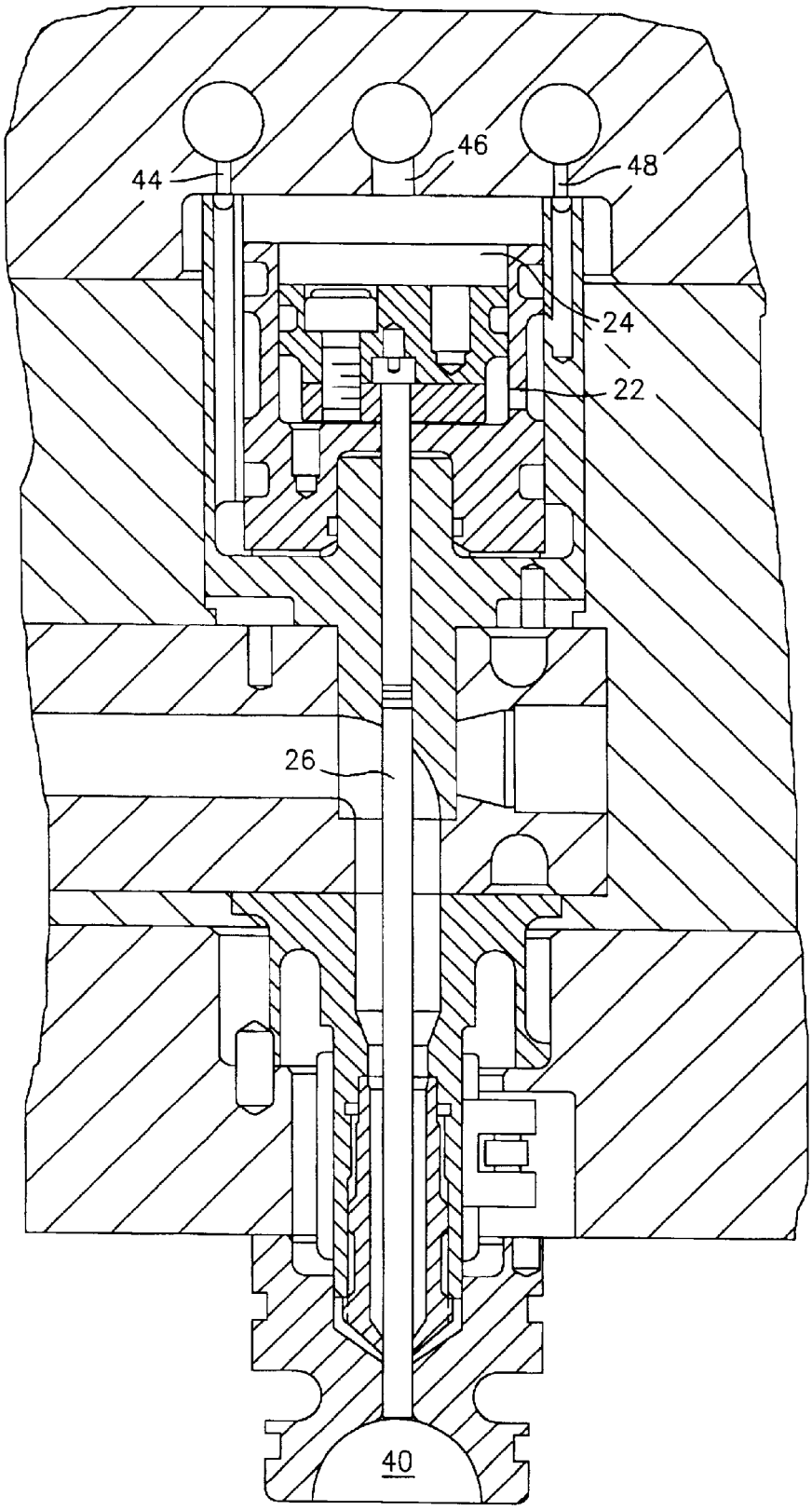
FIG. 3 is a sectional view similar to FIG. 1 with the valve stem in the advanced position.

Referring to the drawings which show a preferred embodiment of the nozzle assembly of the present invention, FIGS. 1–3 show the nozzle assembly in each of three valve stem positions. FIG. 1 shows injection nozzle 10 including nozzle housing 12 and nozzle tip 14 secured thereto. The injection nozzle is located in mold manifold plate 16 and supporting manifold 18. Mounted in manifold 18 is valve bushing 20 that contains two pneumatic pistons 22, 24 to which is attached valve stem 26.

Melt channel 28 in manifold 18 is connected to central melt channel 30 in nozzle housing 12 which in turn leads to injection orifice or gate orifice 32 in gate pad 34. Insulator 36 occupies the space between nozzle tip 14 and gate pad 34 and also contains a melt channel opening 38 therein. When the valve stem 26 is in the fully retracted position as shown in FIG. 1 resin can be injected through the melt channels to fill mold cavity 40 in a known fashion. This mold cavity has a gate nub 42 so that when the mold cavity 40 and nub 42 are filled with resin a molded part is formed having a nub.

Pneumatic pistons 22, 24 are operated by air pressure through lines 44, 46, 48 from a source of compressed air (not shown) such that by directing compressed air appropriately valve stem 26 can be moved to one of three positions. In FIG. 1 both pistons 22 and 24 are fully retracted by compressed air causing both of the pistons to move upward thereby fully retracting valve stem 26 within nozzle housing 12 and permitting resin to flow into the gate nub and mold cavity. Thus, in FIG. 1 compressed air is introduced into line 48 causing piston 24 to retract and is also introduced into line 44 causing piston 22 to retract. This fully retracts valve stem 26.

FIG. 2 shows valve stem 26 in the gate closed position shutting off resin flow to the filled mold cavity 40 and to the filled gate nub 42. The valve stem is moved to the gate closed position shown in FIG. 2 by introducing compressed air into line 44 to maintain piston 22 in the retracted position and also introduced into line 46 to advance piston 46 slightly forward and thus close injection orifice 32. Cooling channels 50 in gate pad 34 cause resin in the mold cavity 40 and gate nub 42 to solidify prior to opening the mold.

FIG. 3 shows valve stem 26 in the advanced position protruding into the gate nub area and thereby assisting in the ejection of the molded part as the mold is opened and also clearing any debris that may have accumulated in the gate nub area. The valve stem is moved to the advanced position shown in FIG. 3 by exhausting air from line 44 to permit piston 22 to move forward and introducing compressed air into line 46 to move both pistons 22 and 24 forward.

Debris can accumulate in front of the valve stem in the nub from a variety of causes such as; the stem is opened too soon by the operator in the process; or a short shot is molded (a partially filled cavity) wherein the partial molding sticks in the cavity and cannot be ejected normally from the core side of the mold; or if during maintenance the stem is operated manually dislodging frozen plastic in the area; or plastic may leak around the side of the stem and partially solidify in the nub area. By advancing the valve stem 26 in accordance with the present invention as shown in FIG. 3, prior to restarting, any such leakage or drool can be easily and conveniently pushed away from the gate area thereby completely clearing the gate area for a smooth restart of the molding operation.

Thus, the present invention provides a simple and expeditious three position hot runner valve stem that can advance the valve stem into the mold cavity nub area to assist in part ejection during mold opening and also to clear debris from the area.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection nozzle for injection molding resin from a source of molten resin to a mold cavity, which comprises:

a mold cavity;

an injection nozzle having a nozzle body and a nozzle tip and having an internal flow channel therein communicating with an injection orifice which in turn communicates with said mold cavity for transportation of molten resin to the mold cavity;

a valve gate nub area between the mold cavity and injection orifice;

a valve stem mounted in the injection nozzle; and means to move the valve stem between an open position retracted from the injection orifice permitting the flow of resin to the mold cavity, a fully closed position blocking the injection orifice and preventing flow of resin to the mold cavity, and an advanced position past the fully closed position and within the valve gate nub area to assist in ejection of a molded part and to clear the valve gate nub area.

2. An injection nozzle according to claim 1, wherein the valve gate nub area includes a passageway between the mold cavity and the injection orifice with an annular wall, wherein in the advanced position the valve stem is moved adjacent said annular wall to substantially fill the passageway.

3. An injection nozzle according to claim 2, wherein said valve stem has a continuous forward wall which extends completely across said passageway in the advanced position and a continuous annular wall extending therefrom which extends completely within the annular wall of said passageway in the advanced position.

4. An injection nozzle according to claim 1, including at least one piston connected to said valve stem operative to move said valve stem between the open, closed and advanced positions.

5. An injection nozzle according to claim 4, including two of said pistons connected to said valve stem operative to move the value stem between the open, closed and advanced positions.

6. An injection nozzle according to claim 1, wherein said internal flow channel is connected to a hot runner channel.

7. An injection nozzle according to claim 6, including at least three air inlets operative to move said pistons.

8. A method for injection molding, which comprises:

providing an injection nozzle having a nozzle body and a nozzle tip and having an internal flow channel therein communicating with an injection orifice which in turn communicates with a mold cavity;

transporting molten resin from said internal flow channel to said mold cavity;

positioning a valve gate nub area between the mold cavity and injection orifice;

mounting the valve stem between an open position retracted from the injection orifice permitting the flow of resin to the mold cavity, a fully closed position blocking the injection orifice and preventing flow of resin to the mold cavity, and an advanced position past the fully closed position within the valve gate nub area to assist in ejection of a molded part and to clear the valve gate nub area.

9. A method according to claim 8, including providing a passageway with an annular wall in the valve gate nub area between the mold cavity and injection orifice, and moving the valve stem in the advanced position adjacent said annular wall to substantially fill the passageway.

10. A method according to claim 8, including moving the valve stem with at least one piston between the open, closed and advanced positions.

11. A method according to claim 10, including moving the valve stem with two of said pistons between the open, closed and advanced positions.

12. A method according to claim 8, including connecting said internal flow channel to a hot runner channel.

*13. A method according to claim 11, including moving said pistons by pressurized air supplied by at least three channels.*

*14. A valve gate assembly for injection molding, in use, resin into a mold cavity, the valve gate assembly comprising:*

*an injection nozzle having a nozzle body and a nozzle tip and having an internal flow channel therein communicating with an injection orifice which in turn communicates with said mold cavity for the transfer, in use, of resin to the mold cavity;*

*a valve gate area between the mold cavity and injection orifice;*

*a valve stem operatively positioned in the injection nozzle; and*

*means to move the valve stem between (i) an open position retracted from the injection orifice permitting the flow of resin to the mold cavity, (ii) a fully closed position blocking the injection orifice and preventing flow of resin to the mold cavity, and (iii) an advanced position past the fully closed position and within the valve gate area to clear the valve gate area.*

*15. The valve gate assembly according to claim 14, wherein the valve gate area includes a passageway between the mold cavity and the injection orifice, wherein in the advanced position the valve stem is moved to substantially fill the passageway.*

*16. The valve gate assembly according to claim 15, wherein said valve stem has a forward wall which extends across said passageway in the advanced position and a continuous annular wall extending therefrom which extends completely within said passageway in the advanced position.*

*17. The valve gate assembly according to claim 14, including at least one piston, connected to said valve stem, operative to move said valve stem between the open, closed and advanced positions.*

*18. The valve gate assembly according to claim 15, including at least one piston, connected to said valve stem, operative to move said valve stem between the open, closed and advanced positions.*

*19. The valve gate assembly according to claim 16, including at least one piston, connected to said valve stem, operative to move said valve stem between the open, closed and advanced positions.*

*20. The valve gate assembly according to claim 17, including at least three air inlets operative to move said at least one piston.*

*21. The valve gate assembly according to claim 14, wherein said internal flow channel is in communication with a hot runner channel.*

*22. The valve gate assembly according to claim 14, wherein said injection orifice is configured sealingly to receive said valve stem to substantially stop the flow of resin to the mold cavity.*

*23. A valve gate assembly containing a nozzle body and a nozzle tip, the nozzle body having an internal channel terminating at the nozzle tip, the valve gate assembly further including a valve stem located within the internal channel and a valve stem actuator coupled to the valve stem to control a position of the valve stem relative to the nozzle tip, the valve gate assembly comprising:*

*the valve stem actuator being configured to cause extension of the valve stem between (i) an open position, (ii) a fully closed position, and (ii) an advanced position beyond the fully closed position, the advanced position being sufficiently beyond the nozzle tip to cause the valve stem to clear away debris accumulated in front of the valve stem.*

*24. A method of operating a valve gate assembly associated with an injection mold, the valve gate assembly containing a nozzle body and a nozzle tip, the nozzle body having an internal channel terminating at the nozzle tip, the valve gate assembly further including a valve stem located within the internal channel and a valve stem actuator coupled to the valve stem to control a position of the valve stem relative to the nozzle tip, the method including the steps of:*

*operating the valve stem actuator to move the valve from an open position to a fully closed position; and*

*operating the valve stem actuator to move the valve stem beyond the fully closed position and beyond the nozzle tip such that the valve stem acts to clear away debris accumulated in front of the valve stem.*

*25. A method of clearing plastic debris from the vicinity of a gate orifice of a gate pad, the method comprising:*

*moving the valve stem from an open position to a fully closed position; and*

*forcing the valve stem beyond the fully closed position to extend through the gate orifice, to clear debris from the vicinity of the gate orifice.*

*26. An injection molding apparatus for injection molding from a source of molten material to a mold cavity, said nozzle comprising:*

*a mold cavity;*

*an injection nozzle having a nozzle body and a nozzle tip and having an internal flow channel therein communicating with an injection orifice which in turn communicates with said mold cavity for the transfer of molten material to the mold cavity;*

*a valve gate area between the mold cavity and the injection orifice;*

*a valve stem operatively positioned in the injection nozzle; and*

*structure to move the valve stem between (i) an open position retracted from the injection orifice permitting the flow of material to the mold cavity, (ii) a fully closed position blocking the injection orifice and preventing flow of material to the mold cavity, and (iii) an advanced position past the fully closed position and within the valve gate area to clear the valve gate area.*

*27. Apparatus according to claim 26, wherein the valve gate area includes a passageway between the mold cavity and the injection orifice, wherein in the advanced position the valve stem is moved to substantially fill the passageway.*

*28. Apparatus according to claim 27, wherein said valve stem has a continuous forward wall which extends com-*

*pletely across said passageway in the advanced position and a continuous annular wall extending therefrom which extends completely within said passageway in the advanced position.*

*29. Apparatus according to claim 26, including at least one piston connected to said valve stem operative to move said valve stem between the open, closed, and advanced positions.*

*30. Apparatus according to claim 29, including two of said pistons connected to said valve stem operative to move the value stem between the open, closed and advanced positions.*

*31. Apparatus according to claim 26, wherein said internal flow channel is in communication with a hot runner channel.*

*32. Apparatus according to claim 29, including at least three air inlets operative to move said pistons.*

*33. Apparatus according to claim 26, wherein said molded part is a short shot that has not completely filled said mold cavity.*

*34. An injection nozzle for injection molding from a source of molten material, said nozzle comprising:*

*an elongated nozzle housing having an internal flow channel therein, said internal flow channel in communication with the source of molten material for communication of the molten material to a mold cavity; and*

*a valve stem configured to (i) open the flow channel, (ii) fully close the flow channel, and (iii) move beyond the fully close position to clear said mold cavity of debris.*

*35. The injection nozzle according to claim 34, further comprising a piston configured to move said valve stem.*

*36. The injection nozzle according to claim 35, wherein said piston is an air piston.*

*37. The injection nozzle according to claim 34, wherein said valve stem is disposed in said internal flow channel.*

*38. The injection nozzle according to claim 37, wherein said valve stem is disposed substantially coaxial to said internal flow channel.*

*39. The injection nozzle according to claim 34, further comprising a nozzle tip affixed to said nozzle housing adjacent the mold cavity.*

*40. The injection molding nozzle according to claim 39, wherein said nozzle tip comprises a central melt channel in fluid communication between said internal flow channel and the mold cavity.*

*41. The injection molding nozzle according to claim 40, wherein said nozzle tip further comprises an orifice in fluid communication between said central melt channel and the mold cavity.*

*42. The injection molding nozzle according to claim 41, wherein said orifice is configured to sealingly receive said valve stem when said valve stem is positioned to substantially stop the flow of the material to the mold cavity.*

*43. The injection molding nozzle according to claim 39, further comprising an insulator disposed between said nozzle tip and the mold cavity.*

*44. The injection molding nozzle according to claim 43, further comprising a first piston configured to limit the stroke of a second piston, said second piston affixed to said valve stem.*

*45. The injection molding nozzle according to claim 44, wherein said second piston is sealingly disposed in a cavity of said first piston and said first piston sealingly disposed in a piston cavity associated with a respective said injection molding nozzle.*

*46. The injection molding nozzle according to claim 45, wherein said first piston is moved to a first position to allow said second piston to move said valve stem between an open and fully closed position to start and stop the flow of molten material, and said first piston is further positioned to allow said second piston to move said valve stem to clear a gate orifice of substantially solidified material associated with a respective nozzle.*

*47. A method of clearing a gate orifice of an injection mold comprising the steps of:*

*providing a valve stem movable between (i) a first position where molten material may flow through the gate orifice, (ii) a second position to fully stop the flow of molten material through the gate orifice, and (iii) a third position beyond the second position whereby said valve stem is placed completely through the gate orifice; and*

*placing said valve stem through said gate orifice to remove debris therefrom.*

*48. The method according to claim 47, wherein said solidified material comprises a short shot that did not completely fill a mold cavity associated with said gate orifice.*

*49. The method according to claim 47, further comprising the steps of:*

*placing at least one piston in communication with said valve stem to position said valve stem in a predetermined position relative to the gate orifice; and*

*applying energy to said at least one piston to extend said valve stem through said orifice to remove the solidified material from said gate orifice.*

*50. The method according to claim 47, wherein said solidified material comprises a short shot that failed to completely fill the mold cavity.*

*51. The method according to claim 47, wherein said solidified material is produced as a result of a short shot.*

*52. The method according to claim 47, wherein said solidified material comprises a PET preform.*

*53. The method according to claim 47, wherein said debris comprises solidified material that leaked around said valve stem when said valve stem was in a closed position.*

*54. An injection molding system for the formation of a molded article comprising:*

*structure configured to provide a supply of molten material in communication with a melt channel in a manifold;*

*a manifold plate having a cavity formed therein for the receipt of a nozzle housing;*

*a central melt channel in said nozzle housing in fluid communication between said melt channel and a mold cavity; and*

*a valve element configured to start and stop the flow of molten material to the mold cavity, said valve element being movable between an open position, a fully closed position, and a position beyond the fully closed position to clear debris from a gate area.*

*55. The injection molding system of claim 54, further comprising a nozzle tip in fluid communication between said nozzle housing and the mold cavity.*

*56. The injection molding system of claim 55, wherein said nozzle tip comprises a gate orifice adjacent the mold cavity.*

*57. The injection molding system of claim 56, wherein said gate orifice is configured to sealingly receive said valve element to substantially stop the flow of molten material to the mold cavity.*

*58. The injection molding system of claim 57, wherein said valve element is an elongated cylindrical member that*

*is configured to extend through said gate orifice a predetermined distance.*

*59. The injection molding system of claim 58, wherein said valve element extends coaxially in said central melt channel.*

*60. The injection molding system of claim 54, further comprising a valve bushing inserted into a cavity of said manifold, said valve bushing having a passageway in fluid communication between said melt channel and said central melt channel.*

*61. The injection molding system of claim 60, further comprising a piston configured to selectively position said valve element in relation to said gate orifice.*

*62. A method for injection molding, which comprises the steps of:*

*providing an injection nozzle having a nozzle body and a nozzle tip, said nozzle having an internal flow channel therein communicating with an injection orifice which in turn communicates with a mold cavity;*

*transporting molten material from said internal flow channel to said mold cavity;*

*providing a valve gate area between the mold cavity and injection orifice;*

*mounting the valve stem between (i) an open position retracted from the injection orifice permitting the flow of material to the mold cavity, (ii) a fully closed position blocking the injection orifice and preventing flow of resin to the mold cavity, and (iii) an advanced position past the fully closed position within the valve gate area to clear the valve gate area.*

*63. A method according to claim 62, including providing a passageway with an annular wall in the valve gate area between the mold cavity and injection orifice, and moving the valve stem in the advanced position adjacent said annular wall to substantially fill the passageway.*

*64. A method according to claim 62, including moving the valve stem with at least one piston between the open, closed and advanced positions.*

*65. A method according to claim 64, including moving the valve stem with two of said pistons between the open, closed and advanced positions.*

*66. A method according to claim 62, including connecting said internal flow channel to a hot runner channel.*

*67. An injection nozzle for injection molding from a source of molten material, said nozzle comprising:*

*a nozzle housing means having an internal flow channel therein, said internal flow channel in communication with the source of molten material for communication of the molten material to a mold cavity;*

*a valve element means configured to move between an open position and a fully closed position to respectively start and stop the flow of the molten material to the mold cavity, said valve element means also being configured to move to a position beyond the fully closed position to clear at least a portion of said mold cavity of solidified material.*

*68. The injection nozzle according to claim 67, further comprising a piston means configured to move said valve element means.*

*69. The injection nozzle according to claim 68, wherein said piston means is an air piston.*

*70. The injection nozzle according to claim 67, wherein said valve element means is disposed in said internal flow channel.*

*71. The injection nozzle according to claim 70, wherein said valve element means is disposed substantially coaxial to said internal flow channel.*

*72. The injection nozzle according to claim 71, further comprising a nozzle tip means affixed to said nozzle housing means adjacent the mold cavity.*

*73. The injection molding nozzle according to claim 72, wherein said nozzle tip means comprises a central melt duct in fluid communication between said internal flow channel and the mold cavity.*

*74. The injection molding nozzle according to claim 73, wherein said nozzle tip means further comprises an orifice means in fluid communication between said central melt duct and the mold cavity.*

*75. The injection molding nozzle according to claim 74, wherein said orifice means is configured to sealingly receive said valve element means when said valve element means is positioned to substantially stop the flow of the material to the mold cavity.*

*76. The injection molding nozzle according to claim 75, further comprising an insulator means affixed between said nozzle tip means and the mold cavity.*

* * * * *

UNITED STATES PATENT AND TRADEMARK OFFICE

CERTIFICATE OF CORRECTION

PATENT NO. : RE 38,480 E
DATED : March 30, 2004
INVENTOR(S) : Bruce Catoen et al.

It is certified that error appears in the above-identified patent and that said Letters Patent is hereby corrected as shown below:

Column 4,
Line 65, “orifice;” should read -- orifice; and --.
Line 66, “mounting the valve stem” should read -- moving the valve stem --.

Column 6,
Line 44, “nozzle comprising:” should read -- apparatus comprising: --.

Column 7,
Line 29, “fully close position” should read -- fully closed position --.
Line 63, “and said first piston sealingly disposed” should read -- and said first piston is sealingly disposed --.

Column 9,
Line 23, “orifice;” should read -- orifice; and --.
Line 24, “mounting the valve stem” should read -- moving the valve stem --.

Signed and Sealed this

Fifteenth Day of November, 2005

JON W. DUDAS
*Director of the United States Patent and Trademark Office*